(12) United States Patent
Pieruch

(10) Patent No.: US 7,281,733 B2
(45) Date of Patent: Oct. 16, 2007

(54) ATTACHMENT OF AIRBAG MODULE TO VEHICLE

(75) Inventor: Martin Pieruch, Hochheim (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 355 days.

(21) Appl. No.: 11/053,289

(22) Filed: Feb. 8, 2005

(65) Prior Publication Data

US 2005/0179237 A1    Aug. 18, 2005

(30) Foreign Application Priority Data

Feb. 17, 2004    (DE) ............... 10 2004 007 630

(51) Int. Cl.
  B60R 21/16    (2006.01)
  B60R 21/20    (2006.01)
  B60R 21/207    (2006.01)
  B60R 21/21    (2006.01)

(52) U.S. Cl. .................. 280/728.2; 280/730.2

(58) Field of Classification Search ............ 280/728.2, 280/730.2
See application file for complete search history.

(56) References Cited

U.S. PATENT DOCUMENTS

| | | | |
|---|---|---|---|
| 5,547,214 A | 8/1996 | Zimmerman, II et al. | |
| 5,639,112 A | 6/1997 | Phillion et al. | |
| 5,860,673 A * | 1/1999 | Hasegawa et al. | 280/730.2 |
| 6,017,055 A | 1/2000 | Cuevas | |
| 6,045,182 A * | 4/2000 | Chevallier et al. | 297/216.13 |
| 6,126,192 A | 10/2000 | Enders | |
| 6,443,485 B1 * | 9/2002 | Muhlbacher et al. | 280/730.2 |
| 6,592,144 B2 * | 7/2003 | Acker et al. | 280/730.2 |
| 2002/0060447 A1 * | 5/2002 | Acker et al. | 280/730.1 |
| 2003/0098571 A1 * | 5/2003 | Jost et al. | 280/728.2 |
| 2004/0084881 A1 * | 5/2004 | Helmstetter | 280/728.2 |
| 2004/0227332 A1 * | 11/2004 | Scherer | 280/728.2 |

FOREIGN PATENT DOCUMENTS

| | | |
|---|---|---|
| DE | 43 40 999 A1 | 12/1993 |
| DE | 198 50 648 A1 | 11/1998 |

\* cited by examiner

Primary Examiner—Eric Culbreth
Assistant Examiner—Joselynn Y. Sliteris
(74) Attorney, Agent, or Firm—Lonnie Drayer

(57) ABSTRACT

An airbag module, in particular for a side airbag, has an airbag and a fastening element, preferably having a longitudinal profile, on which the airbag is arranged directly or indirectly via an airbag module housing. The fastening element has a substantially U-shaped cross-section and is constructed in such a way as to grip in a complementary form-fitting manner around a structural element of a vehicle.

18 Claims, 2 Drawing Sheets

ATTACHMENT OF AIRBAG MODULE TO VEHICLE

FIELD OF THE INVENTION

The present invention relates to an airbag module, in particular to a side airbag, and to a vehicle with an airbag module.

BACKGROUND OF THE INVENTION

Airbag modules for side airbags are well known from the prior art. Thus, for instance, U.S. Pat. No. 5,547,214 teaches a side airbag system within the backrest of a vehicle seat, in which the airbag is mounted on a support plate, which is screwed to the seat frame. U.S. Pat. No. 6,126,192 likewise teaches a side airbag system, in which the airbag module is mounted on a fastening plate, which is connected to a structural element of the vehicle. The fastening plate comprises a plurality of catch hooks, which are inserted through corresponding openings in the structural element and catch therein.

However, a problem of such fastening solutions, which act merely by catching, is that they do not always withstand high impulse forces during airbag deployment. Moreover, it cannot be guaranteed that the airbag module is engaged correctly on installation, i.e. not tilted, when in particular a check is likewise difficult to perform. Where the solution involves a screw connection, it is necessary to provide threads or nuts which are also accessible from the inside, i.e. the side remote from the airbag module, in order to attach a nut to a fastening bolt of the fastening plate. This results in complex mounting and leads to high costs.

SUMMARY OF THE INVENTION

The present invention provides an airbag module, in particular for a side airbag, and a vehicle with an airbag module, in particular for a side airbag, wherein simple and inexpensive fastening of the airbag module to the frame may be ensured and wherein the airbag module is capable of absorbing high airbag deployment forces.

According to the invention, an airbag module, in particular for a side airbag, has an airbag and a fastening element, preferably in the form of a longitudinal profile, on which the airbag is arranged directly or indirectly via an airbag module housing. The fastening element has a substantially U-shaped cross-section and is constructed in such a way as to grip in a complementary form-fitting manner around a structural element of a vehicle.

DETAILED DESCRIPTION OF THE INVENTION

Figure 1:
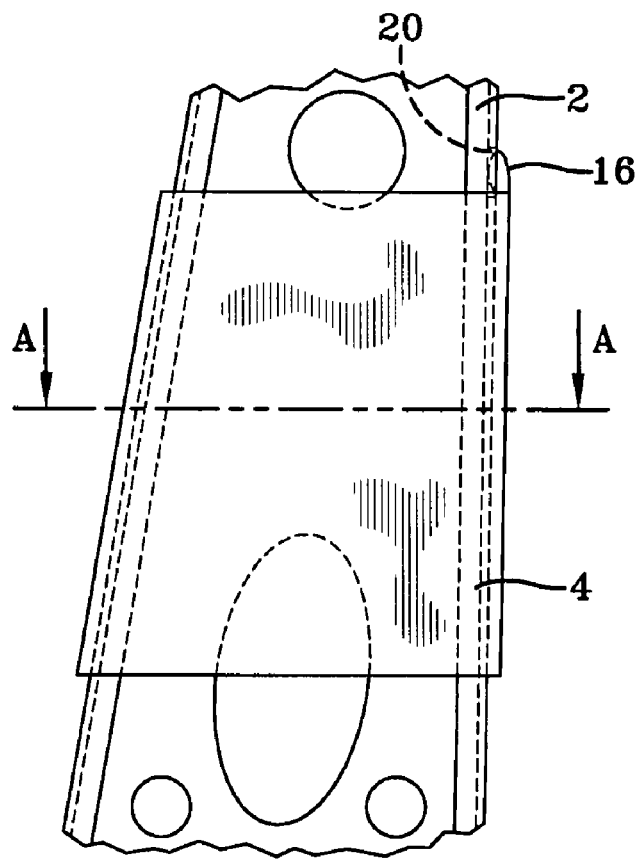
FIG. 1 is a plan view of the airbag module according to the invention.

FIG. 1 shows the airbag module according to the invention when attached to a structural element 2 of a vehicle, preferably a motor vehicle. The structural element 2 is for example part of a seat frame, in particular a backrest, of a vehicle. It may also be part of the A, B or C pillar of the vehicle. However, the structural element is not restricted to these two vehicle components, but rather may constitute any structural element of a vehicle to which an airbag module is to be fastened.

Figure 2:
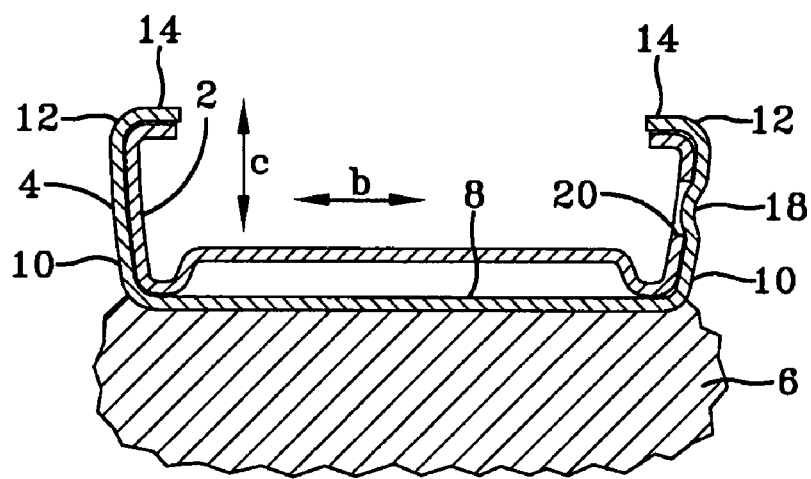
FIG. 2 is a cross-sectional view of the airbag module according to the invention along section A-A of FIG. 1.

The airbag module comprises a fastening element 4, to which an airbag 6 is fastened directly or indirectly, as shown in FIG. 2. Indirect fastening takes place via an airbag module housing (not shown), which accommodates the airbag 6 and is attached to the fastening element 4. Direct fastening of the airbag 6 to the fastening element 4 may be achieved by fitting the airbag for example on hooks provided on the fastening element 4. In addition or as an alternative, the airbag 6 may also be attached to the fastening element 4 via a gas generator located in the airbag 6, which gas generator is arranged on the fastening element 4 using fastening means, such as for example screws or rivets.

The fastening element 4 may take the form, for example, of a beveled or bent metal plate. The fastening element 4 is of substantially U-shaped cross-section, said cross-section being illustrated in FIG. 2 for example along line A-A of FIG. 1. In cross-section, the fastening element comprises a base portion 8 and two leg portions 10 arranged thereon. The leg portions extend substantially perpendicular to the base portion 8. However, the leg portions 10 may also extend from the base portion 8 at an angle other than 90°, in particular preferably directed slightly towards one another, i.e. the distal ends 12 of the legs 10 exhibit a smaller distance from one another than the areas of the leg portions 10 at the base portion 8. Secure engagement with or mounting on the structural element 2 is thereby ensured, since the fastening element 4 is prevented from slipping off of the structural element 2. The fastening element 4 is made of a steel sheet for example, which is folded or bent appropriately so that the fastening element 4 takes the form of the profile illustrated in the drawing figures. In the mounted state, as shown in FIG. 2, the fastening element 4 has an internal configuration that corresponds substantially to the external configuration of the structural element 2. It is thus ensured that the fastening element grips around at least three sides of a structural element of a vehicle.

The non-parallel relationship of the sides of the longitudinally extending fastening element 4 is necessary because, as a rule, the structural elements of a frame of a vehicle or vehicle seat are made from a pressed steel sheet, which for strength reasons is non-parallel relationship of the sides, i.e. has a larger cross-section in the lower area than in the top area. This makes it possible to push the airbag module housing, on the side remote from the airbag, i.e. within the U-shaped cross-section, in a complementary form-fitting manner over the structural element extending in the form of a wedge or cone, starting from the side of the structural element which exhibits the smallest cross-section and in the direction of the growing cross-section. This is carried out until the fastening element fits snugly and in a complementary form-fitting manner against the structural element, i.e. the internal configuration of the fastening element corresponds in this area to the external configuration of the structural element.

The structural element 2 may comprise the A, B or C pillar, or even the frame of a vehicle seat if the airbag is arranged in the vehicle seat. The airbag is preferably arranged on a side of the base portion 8 of the fastening element 4, which lies opposite the direction of extension of the legs 10. Due to the lack of other fastening means, for example screws or the like, quick attachment or mounting of the module on the structural element is advantageously ensured. Installation errors are prevented, since no complicated fastening solutions are used, it being necessary merely to push or "clip" the U-shaped fastening element on the structural element 2. In this way, an inexpensive fastening solution is also achieved. Since the airbag deployment forces, i.e. the impulse forces upon deployment of the airbag, may be dissipated widely over the entire fastening element, i.e. over the entire U-shaped cross-section, into the structural element, an airbag is provided which displays the advantage of being operationally safe. In other words, the impulse forces are absorbed by the fastening element over a large area and evenly at the periphery thereof and accordingly dissipated into the frame.

As is clear from FIG. 1, the width of the structural element 2 tapers towards one end. In particular, the width of the structural element 2 tapers in a direction b. Tapering in the depthwise direction c is also possible, however, as an alternative or in addition. The non-parallel relationship of the sides of the structural element 2 shown in FIG. 1 is achieved. The internal configuration of the fastening element 4 corresponds substantially to, that is to say complementary to, the external configuration of the structural element 2 in the area of the structural element 2 in which the fastening element 4 is to be fastened. This consequently makes it possible for the fastening element 4 to grip substantially in a complementary form-fitting manner around the structural element 2, such that the impulse forces arising upon airbag deployment may be transmitted widely via the fastening element 4 to the structural element 2.

The fastening element 4 preferably has at least one projection 14 at each of the distal ends 12 of its leg portions 10. The projections 14 are substantially directed towards one another. These projections may be provided for example by bending or folding the fastening element, in cross-section, at the free ends of the leg portions 10. In this way, improved fastening of the airbag module to the structural element may be ensured, since the fastening element is engaged with the structural element on a side of the structural element opposite the base portion of the fastening element. This makes it possible to absorb higher impulse forces during airbag deployment, so providing a safer airbag. The spacing between the projections 14 is greater than or equal to the engaged width of the structural element 2, in order to allow the fastening element 4 to be pushed onto or arranged on the structural element 2 in an upper area of the structural element 2, i.e. in an area of smaller width, as is explained below with reference to FIG. 3. The two projections 14 may extend substantially along the entire length of the fastening element. The length of the fastening element is defined substantially perpendicularly to its cross-section. As a consequence, wide-area absorption of the forces by the structural element is made possible on a fourth side, namely at the faces of the two projections which make contact with the structural element. Alternatively, a plurality of tab-shaped projections 16 may extend in a spaced manner over some of the length of the fastening element 4. As a consequence, the fastening element is not engaged with the structural element on the fourth side, preferably a side remote from the airbag, over the entire length of the fastening element, but merely in certain areas. Thus, the weight of the airbag module may be reduced as a result of the saving in material.

The fastening element 4 preferably has a catch element, which is a tab 16 or a protrusion 18. The tab 16 or protrusion 18 is designed to engage in a recess or opening 20 in the structural element 2. It is thus possible for the fastening element 4 to be locked in the desired position on the structural element 2. This additionally provides a visible indication as to whether the fastening element 4 has been correctly installed. Alternatively or in addition, a corresponding catch element may also be provided on the structural element 2, which then engages in a corresponding recess or opening in the fastening element 4 and thus indicates correct installation of the fastening element 4. It is of course possible to arrange the projecting tab or protruding protrusion on the structural element and to provide a matching recess or opening in the fastening element.

The catch element is preferably visible in construction, i.e. from an installed position correct mounting of the fastening element on the structural element is indicated visibly, so providing an indicator by means of which installation errors are reduced. Alternatively, the fastening element may also comprise an opening or the like, into which a catch element arranged on a structural element engages appropriately.

The fastening element 4 preferably comprises a resilient material, for example a thin metal sheet. However, any other desired material may also be used, such as for example a plastic material. It is thus possible to arrange the fastening element on the structural element in such a way that it exerts slight pretension on the structural element, in order to prevent rattling noises. Inaccuracies in the manufacture of the structural element are also compensated thereby.

Figure 3:
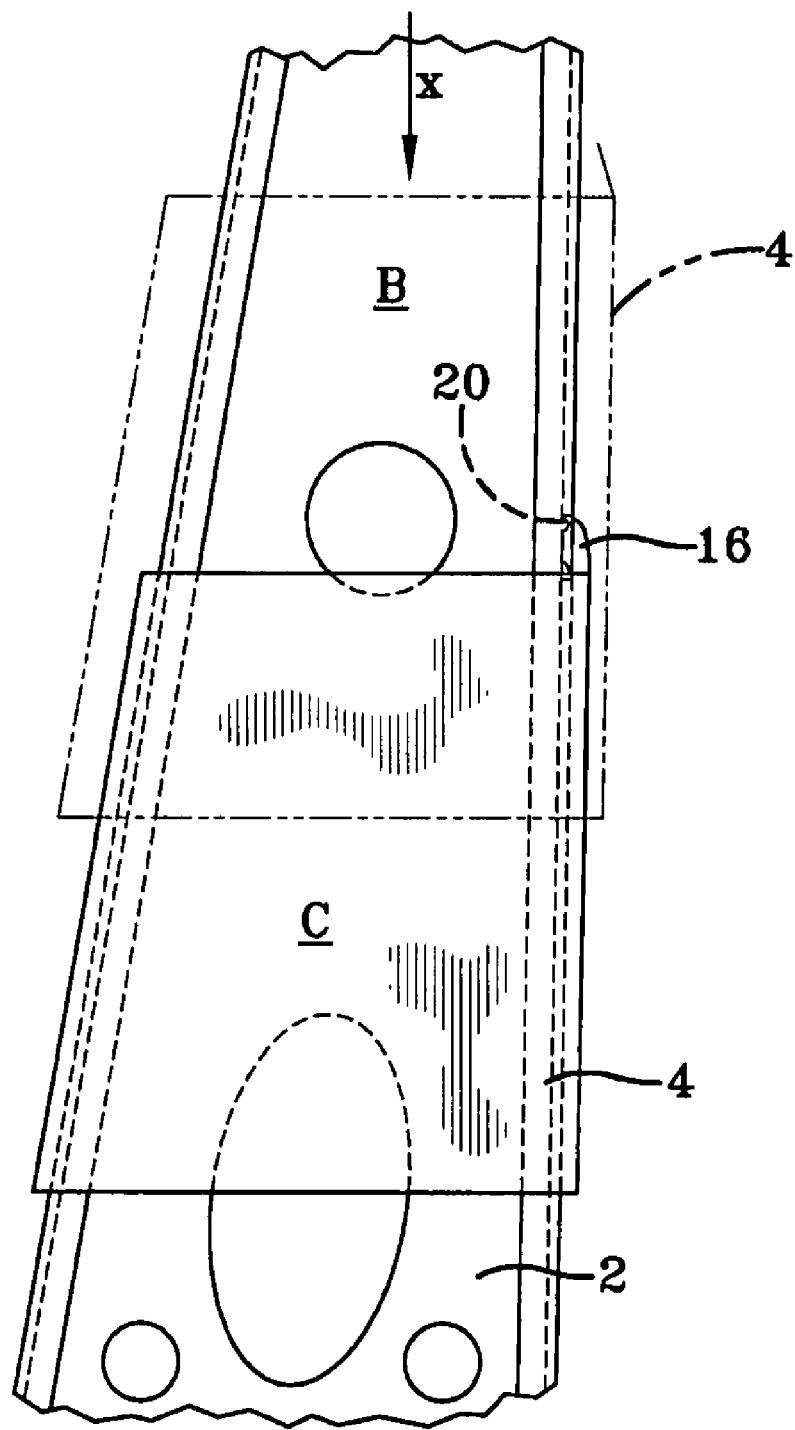
FIG. 3 is a cross-sectional view of the airbag module according to the invention in a position shortly before attachment and when attached to the structural element.

FIG. 3 shows the airbag module according to the invention in the correctly installed or mounted state and in a state (illustrated in broken lines) shortly before the final fastening position. The fastening element 4 is pushed onto the structural element 2 in an area B in the depthwise direction c. In the area B, the mutual spacing of the projections 14 is greater than the width of the structural element 2, so allowing the fastening element 4 to be pushed onto the structural element 2. Then the fastening element 4 is moved in the direction x, i.e. in the direction of the widening part of the structural element 2. In the area C of the structural element 2, the internal configuration of the fastening element 4 corresponds substantially to the external configuration of the structural element 2, so resulting in engagement of the fastening element 4 on the structural element 2, such that the forces acting on the fastening element 4 may be transferred over a wide area to the structural element 2. It is consequently possible to provide an airbag module which may absorb high forces and which may at the same time be attached quickly and inexpensively to the vehicle, since no further fastening means are necessary.

In cross-section the fastening element 4 preferably comprises two projections 14 directed substantially towards one another at the ends of the leg portions 10 that are distal from the base portion 8. The spacing between the projections 14 is preferably greater than or equal to the smallest width of the structural element. The projections are located on an opposite side of the structural element of the vehicle from the base portion of the fastening element. It is thus possible to push the fastening element 4 onto the structural element 2 in the area thereof with the smallest width, then pushing it in the direction of the structural element area of larger cross-section. In the position at which the internal configuration of the fastening element corresponds to the external configuration of the structural element, a form fit is achieved between the structural element and the fastening element, such that the latter is secured. For final fixing, it is possible to lock the fastening element in place by means of a hammer blow in the direction of the side of the structural element with the larger cross-section.

The longitudinal sides of the structural element 2 are preferably not-parallel to one another and the internal configuration of the fastening element 4 is constructed so as to correspond at least partially in a complementary form-fitting manner to the external configuration of the structural element. The structural element tapers, as already explained above, from a lower fastening point towards a fastening point of a vehicle roof or an upper area of a seat. It is thus advantageous to make the internal configuration of the fastening element also taper in accordance with the external configuration of the structural element. As a consequence, at least the width dimensions of the internal configuration of the fastening element correspond over a certain length of the structural element to the external configuration of the latter. In this way, a form fit is made possible in this area between the fastening element and the structural element, so ensuring secure fastening of the airbag module to the structural element.

The fastening element 4 is preferably provided on its inner surface at least in part with a coating to dampen noise or vibrations. This may for example be made from a thin elastomeric film. In addition, the coating may be made of a material which exhibits an increased coefficient of friction relative to metal, in order thus to allow further catching or fastening of the fastening element on the structural element. On the other hand, for easier installation the coating may exhibit surface slip to ease installation. This is preferable in combination with the provision of a catch element for securing the fastening element on the structural element.

In addition, according to the invention a vehicle is provided with an airbag module, in particular for a side airbag, comprising a structural element 2, in particular a pillar supporting a vehicle roof, or a seat, wherein the airbag module comprises an airbag and a fastening element, preferably in a longitudinal profile, on which the airbag is arranged directly or indirectly via an airbag module housing, and wherein the fastening element 4 has the structure that has been disclosed herein attached to the structural element in a complementary form-fitting manner around the structural element. This makes it possible for the impulse forces arising during airbag deployment to be transmitted widely and evenly by the fastening element to the structural element, so achieving an operationally safe airbag module. In addition, rapid attachment or fastening of the airbag module to the structural element is made possible, since no additional fastening means are necessary, the airbag module merely being pushed or clipped onto the structural element.

The disclosed apparatus makes possible fastening from just one structural element side, i.e. accessibility from a correspondingly opposite side, such as in the case of a solution using screws, is not necessary. The U-shaped cross-section of the fastening element 4 is constructed such that the internal configuration of the fastening element corresponds substantially with the external configuration of the structural element 2 at least in the areas of contact between the fastening element and the structural element. Thus, absorption of the impulse forces by the structural element on deployment of the airbag 6 is improved. The airbag 6 may itself be accommodated in an airbag module housing, which is attached to the fastening element, but it is also possible to arrange the airbag directly on the fastening element, such that the fastening element substantially forms the airbag module housing.

It should be understood that although particular embodiments of this invention have been described by way of illustrating the invention, other embodiments are also possible. The invention includes all modifications and equivalents of the disclosed embodiments falling within the scope of the appended claims.

I claim:

1. An airbag module comprising:
   an airbag; and
   a fastening element having a longitudinal profile, on which the airbag is arranged, wherein the fastening element comprises a substantially U-shaped cross-section, the fastening element having two spaced apart leg portions extending from a base portion, the leg portions are in a non-parallel relationship to one another, the fastening element having an internal configuration in a form of a wedge that corresponds to an external configuration of a structural element of a vehicle and being constructed in such a way as to grip at least partially in a complementary form-fitting manner around at least three sides of the structural element of a vehicle.

2. The airbag module according to claim 1, wherein, in cross-section, the fastening element has a projection located at an end of each leg portion distal from the base portion of the fastening element, the projections directed substantially towards one another spaced to allow the fastening element to be positioned over an area of smaller width of the structural element and pushed in to a form fitting manner around the structural element, the projections being engaged on a side of the structural element opposite the base portion.

3. The airbag module according to claim 2, wherein the two projections extend substantially along the entire length of the fastening element.

4. The airbag module according to claim 2, wherein the fastening element further comprises at least one catch element extending from at least one leg portion.

5. The airbag module according to claim 3, wherein the fastening element further comprises at least one catch element extending from at least one leg portion.

6. The airbag module according to claim 5, wherein the catch element is a tab projecting from the fastening element.

7. The airbag module according to claim 5, wherein the catch element is a protrusion protruding from the fastening element.

8. The airbag module according to claim 1, wherein the fastening element comprises a resilient material.

9. The airbag module according to claim 1, wherein the fastening element is provided on a surface that will engage the structural element of a vehicle with a coating to dampen noise or vibrations.

10. A vehicle comprising an airbag module and a structural element, the structural element having longitudinally extending sides that are not parallel to one another, and wherein the airbag module comprises an airbag and a fastening element, on which the airbag is arranged, and wherein the fastening element comprises a substantially U-shaped cross-section, the fastening element having two spaced apart leg portions extending from a base portion, the leg portions are in a non-parallel relationship to one another, the fastening element having an internal configuration in a form of a wedge that corresponds to an external configuration of the structural element of a vehicle and being constructed in such a way as to grip at least partially in a complementary form-fitting manner around at least three sides of the structural element of the vehicle.

11. The vehicle according to claim 10 wherein, in cross-section, the fastening element has a projection located at an end of each leg portion distal from the base portion of the fastening element, the projections directed substantially towards one another spaced to allow the fastening element to be positioned over an area of smaller width of the structural element and pushed in to a form fitting manner around the structural element, the projections being located on an opposite side of the base portion of the fastening element.

12. The airbag module according to claim 11, wherein the two projections extend substantially along an entire length of the fastening element.

13. The airbag module according to claim 11, wherein the fastening element further comprises at least one catch element extending from at least one leg portion, the catch element engaging a recess or an opening in the structural element.

14. The airbag module according to claim 12, wherein at least one catch element extends from the fastening element to engage a recess or an opening in the structural element.

15. The airbag module according to claim 13, wherein the catch element is a tab projecting from the fastening element.

16. The airbag module according to claim 14, wherein the catch element is a tab projecting from the fastening element.

17. The airbag module according to claim 13, wherein the catch element is a protrusion protruding from the fastening element.

18. The airbag module according to claim 14, wherein the catch element is a protrusion protruding from the fastening element.

* * * * *